(12) United States Patent
Raman

(10) Patent No.: US 8,005,909 B2
(45) Date of Patent: Aug. 23, 2011

(54) SYSTEM AND METHOD FOR FACILITATING A READY SOCIAL NETWORK

(75) Inventor: Mouli Raman, Bangalore (IN)

(73) Assignee: Onmobile Global Limited, Bangalore (IN)

( * ) Notice: Subject to any disclaimer, the term of this patent is extended or adjusted under 35 U.S.C. 154(b) by 165 days.

(21) Appl. No.: 12/515,170

(22) PCT Filed: Nov. 14, 2007

(86) PCT No.: PCT/IN2007/000538
§ 371 (c)(1),
(2), (4) Date: May 15, 2009

(87) PCT Pub. No.: WO2008/059534
PCT Pub. Date: May 22, 2008

(65) Prior Publication Data
US 2010/0049802 A1    Feb. 25, 2010

(30) Foreign Application Priority Data
Nov. 16, 2006    (IN) .......................... 2129/CHE/2006

(51) Int. Cl.
*G06F 15/16* (2006.01)

(52) U.S. Cl. ......... 709/206; 709/204; 719/328; 705/319

(58) Field of Classification Search ........... 709/202–206
See application file for complete search history.

(56) References Cited

U.S. PATENT DOCUMENTS

| | | | |
|---|---|---|---|
| 7,249,123 B2 * | 7/2007 | Elder et al. ............................. | 1/1 |
| 2003/0050977 A1 | 3/2003 | Puthenkulam et al. | |
| 2004/0088325 A1 * | 5/2004 | Elder et al. .................. | 707/104.1 |
| 2005/0266836 A1 | 12/2005 | Shan | |
| 2006/0085259 A1 | 4/2006 | Nicholas et al. | |

* cited by examiner

*Primary Examiner* — Jude J Jean Gilles
(74) *Attorney, Agent, or Firm* — Birch, Stewart, Kolasch & Birch, LLP.

(57) ABSTRACT

The invention provides system and method wherein the system collects user activity data including call log information from network equipment, handset and other context specific user activity data including time of call and location information to enable various applications to use the information collected and build social network. In accordance with the method of the invention, the user activity data collected is used to form individual social networks. The networks are formed based on clusters identified by mining the data collected. Furthermore, various applications are provided access to the clustered data to assist in individual social networking. The system of the invention comprises of an application server comprising a centralized data center providing social networking services through a plurality of networks, the networks in-turn connecting a plurality of users through their individual network terminal stations to the application server.

17 Claims, 13 Drawing Sheets

SYSTEM AND METHOD FOR FACILITATING A READY SOCIAL NETWORK

TECHNICAL FIELD

The invention relates to the field of social networking. More particularly, the invention relates to the field of ready social networking based on information available regarding telecommunication subscribers.

BACKGROUND AND PRIOR ART

Social networking is the practice of expanding the number of one's business and/or social contacts by making connections through individuals, which in turn gives rise to social capital. It can be said that an individual with many more social links has correspondingly more social capital than one with fewer.

Social network exist independent of technology and they have been around ever since the advent of societies—people network face-to-face, in public places, via snail mail etc. However, Technology, particularly, e-mail, IM and the Web has made it easier and faster for people to maintain and nurture their immediate social networks. The rise of social networking sites like. Orkut, MySpace, Friendster, Facebook, LinkedIn, YouTube, MSN Spaces, Flickr, Live Journal, Yahoo 360, Ryzc, etc, points to a need in society for such technological aid.

However, despite rising popularity, these networks suffer from some drawbacks, the primary of those being bootstrapping of the network where one has to create an identity and then bring in most of the people you already interact with into the network, and also considerable time and energy has to be spent on the network and one has to actually periodically login and interact using the applications UI The popularity of sharing blogs and music, making friends and dating over the Internet has driven social networking beyond the PC to the mobile phone. The unparalleled potential of mobile phones and carrier networks to promote such connections in enhanced ways is only now being fully recognized and exploited. What exists today are primarily Bluetooth-based short range applications that allow you to interact with 'familiar strangers' in the public space, web-based blogs and file sharing applications with a mobile component that allows members to send text messages to the service to essentially broadcast their location via text messaging to their friends, location-based instant messaging applications, interactive wi-fi applications that allow users to share their music locally through hand-held devices, etc.

The present invention provides a social networking application that brings together the best of breed social networking functionalities in an in-network environment.

STATEMENT OF THE INVENTION

Accordingly, in one embodiment, the present invention provides a system and method wherein the system collects user activity data including call log information from network equipment, handset and other context specific user activity data including time of call and location information to enable various applications to use the information collected and build social network. In accordance with the method of the invention, the user activity data collected is used to form individual social networks. The networks are formed based on clusters identified by mining the data collected. Furthermore, various applications are provided access to the clustered data to assist in individual social networking.

The system of the invention comprises of a centralized application server located at centralized data center providing social networking services through a plurality of networks, the networks in-turn connecting a plurality of users through their individual network terminal stations to the application server.

A user's current social network consists of de people that he interacts with on a regular basis—via Voice, SMS, Email, IM clients, etc. The network operator can form a digital representation of this network based on Voice and SMS call patterns i.e., the number of bidirectional calls between users, time duration of calls or the number of SMS messages sent to a particular user.

In one embodiment the invention provides a software application at the users terminal and another software application at the central application server providing required services to the users station. The central application server is adapted to automatically detect clusters among the various contacts forming a social network of a particular user. For example, a user can view the clusters at the user's station and tag them accordingly. The examples of tags could be "family", "colleagues", "vendors", "friends", etc depending on the nature of the relationship of the user with the contact in question. Furthermore, the application server is adapted to store such tagging information even when a users station is not connected to the network. The application server is also adapted to store and publish content chosen by a user to the other users of his social network.

According to another aspect of the invention, a user's station is adapted to enable the users to customize, tag, enrich and use the social network data as they see fit to manage their network effectively. The user's station provided user interface for tagging contacts with images and text, and thereby enhancing the content, the usability and the effectiveness of his social network. The user's station is also adapted to automatically formulate the network.

According to another aspect of the invention, a user's station is adapted to enable easy content sharing by marking content that one wishes to share and share it with his contacts based on defined tags and access levels set. Other users of the network will be automatically notified and will be able to view the shared content based on their own tag definitions and the access level set by the owner of the content. The user's station may also explicitly disallow the other users from creating a local copy of the shared content.

In another aspect of the invention, the users of the network use the network to form a market place for selling/buying things like house, car etc to other users in the network. The user who intends to sell/buy sends a message. The application saver sends SMS notifications to other users in the network based on the original message. The complete response, including multimedia content, is viewed on the display of the station of the user who sent the original message.

According to another aspect of the invention, the user of the network could find people who are in the vicinity of a location that they are traveling to, who are interest in meeting casually, who are interested in socializing or who are interested in dating. The search of people could be based on interests exchanged or could be based on location and case of access of individuals. The network could also be used to find people for professional associations. Alternatively, the network could also be used to discuss various issues in the form of blogs.

In another aspect of the invention, a user's station provides interface to access the enriched database through which the user call block/forward based on tags. For example, the user can set preferences in such a way that all calls from people that have marked as "Vendor" will be forward to his Voice mail box. Also, a user's station allows to set Ring Back Tones based on tags. For example, all, the adult content can be set access for friends and religious content set for relatives.

An object of the invention is to provide a system and method that enables a ready social network to the subscriber based on available information.

Further objects, features and advantages will become apparent from the following description, claims ad drawings.

BRIEF DESCRIPTION OF THE DRAWINGS

The above aspects of the invention are described in detail with reference to the attached drawings, where.

DETAILED DESCRIPTION OF THE INVENTION

Figure 1:
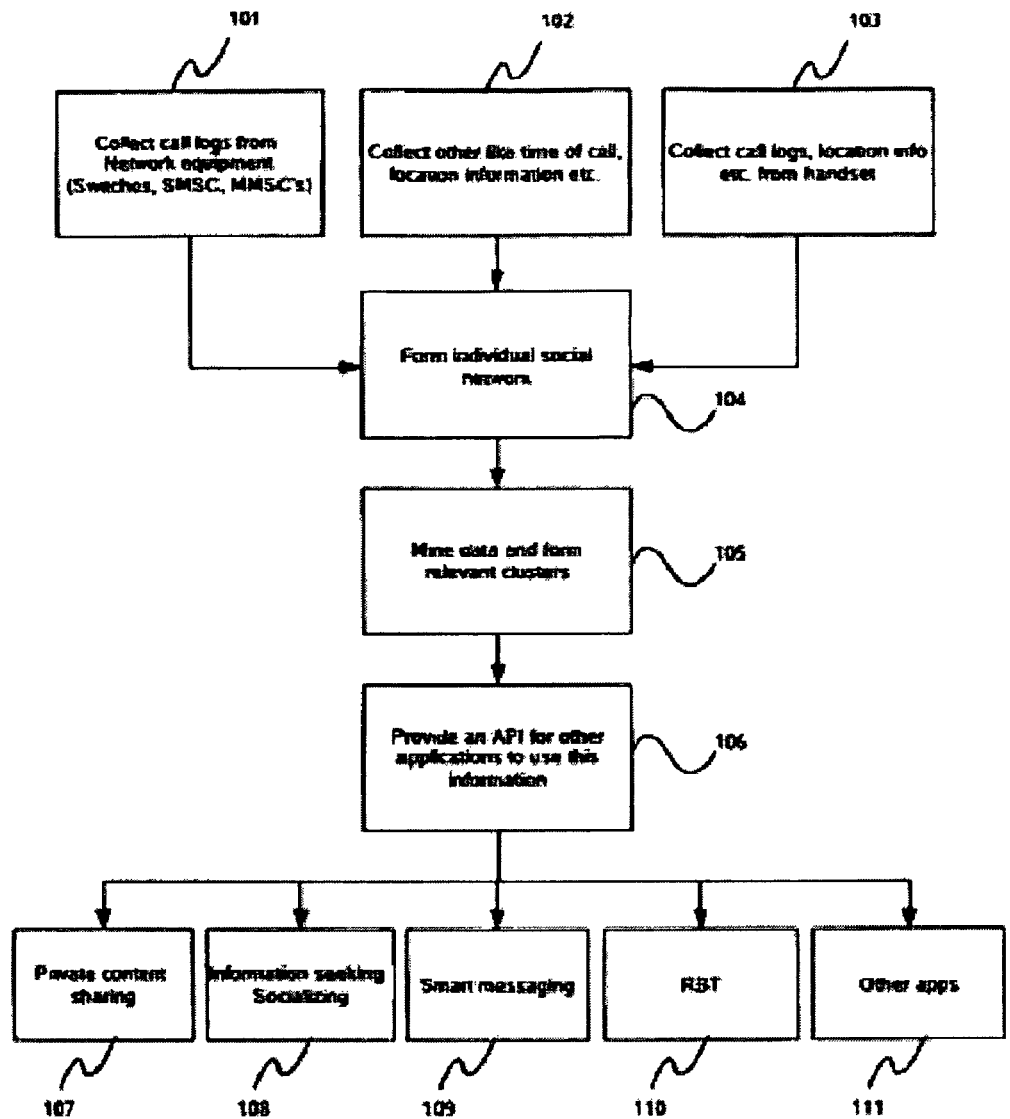
FIG. 1 illustrates the method of the invention

FIG. 1 broadly illustrates the method of the invention. According to one embodiment of the method of the invention, user activity data is collected from various available sources to be able to form a ready social network. The data on a user's activity is collected from the network equipment that facilitate networking of the user's network terminal station, including switches, SMSC's and MMSC's (101). The data also includes call logs, and the location information of the terminal station (103). Data relating to a user's interaction (time of call, location etc) with other people on network through calls is also used to form one's social network (102). For example, a phone running on an operating system (for example, Symbian Operating System) provides APIs to record the user's call details. The system uses these APIs to log all call information and upload the same to the central application server periodically.

The data collected is used to identify people that could form the social network of the user (104). Once the network is formed, data relating to the user's interaction within the network is collected on a continuous basis and such data is used to identify clusters of contacts within the network (105). Such clusters are suggested to the user for further customizing, tagging, enriching and using the network. The user's station is provided access to the clustered data through various applications (106). The various applications that could use the interface for the clustered data include but are not limited to applications for private content sharing (107), information seeking/socializing (108), smart messaging (109), and ring back tones (RBT) (110).

Figure 2:
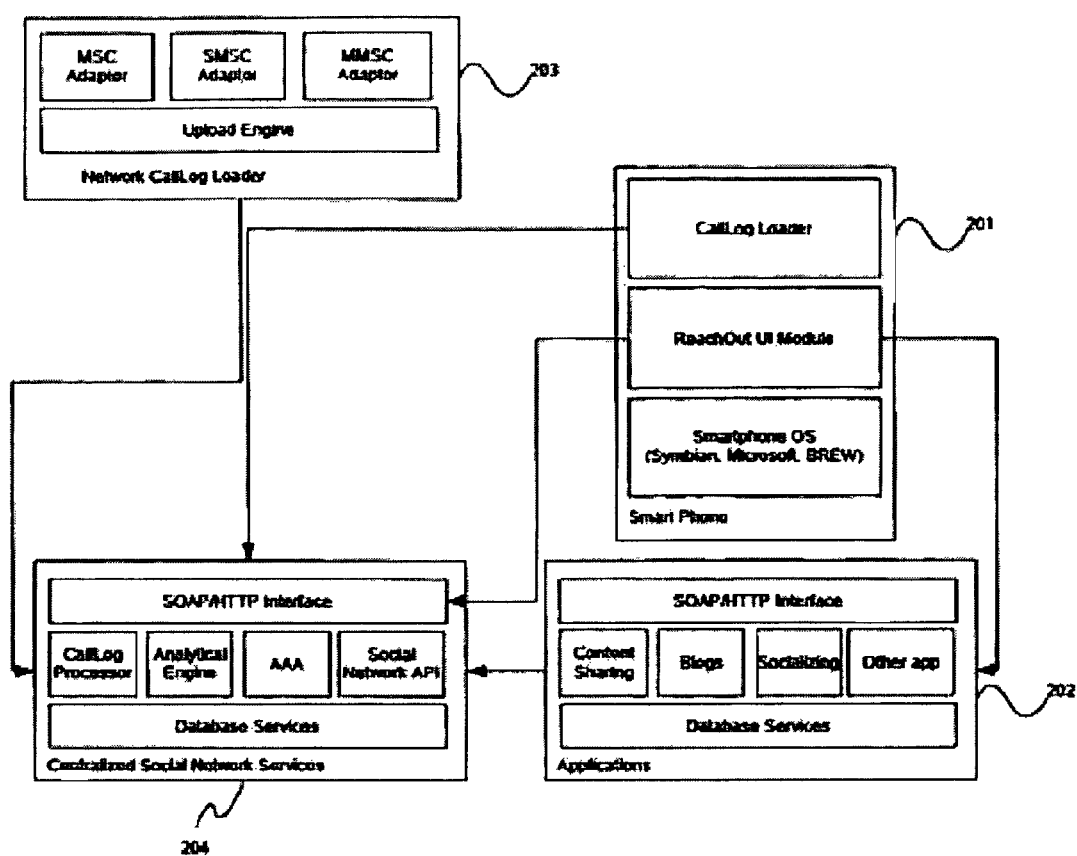
FIG. 2 provides a logical architectural view of the system of the invention

FIG. 2 provides a logical architectural view of the system of the invention. According to one embodiment of the system of the invention, the system architecture comprises of a smart phone (201), a set of application services module (202) providing services to the smart phone (202), a network call log loader (203), and a centralized social network service module (204).

The Centralized social network service module (204) hosts the social network application programming interface (API) to enable the application services and the user interface software at end user's terminal station access the interface and obtain relevant information to enable ready social networking. The centralized social network service module (204) continuously gets uploads of call log data from call log loaders from both network call log loader and the call log loader in the end user's terminal station. The centralized social network service module's (204) analytical engine processes the data uploaded to form/build the ready social network and does the clustering of the data for further use by the application services and the user interface application at the end user's terminal station. The centralized network service provides a provides access to the social network API either through standard a Simple Object Access Protocol (SOAP) or a standard Hyper Text Transfer Protocol (HTTP) or any such standard protocol.

Various application service including but not limited to content sharing, blogging, and socializing are provided a applications that are built upon the centralized networking service API. The UI module at the end user's terminal station uses the various application services provided. In turn, the application services module (202) uses the centralized networking service for data relating to the network. The applications services are exposed to the end user's terminal station either through SOAP or HTTP or any such standard protocol.

According to the example logical architecture, a smart phone (201) is the user's terminal station that he uses to interact with others in the social network. The smart phone (201) typically requires an operating system (OS) to be able to be run the applications, required for ready social networking. For example, the OS could be a Symbian OS, Windows CE or BREW. The OS of the smart phone (201) runs various applications including but not limited to the call log loader and the UI module to enable ready social networking. The call log loader of the smart phone (201) uploads call log data to the centralized social networking service module either through SOAP or HTTP or any such standard protocol as implemented by the centralized social networking service module. The UI module also calls upon the application services module (202) to render information as and when required using SOAP or HTTP or any such standard protocol as implemented by the application services module (202).

The network call log loader module (203) of the system hosts adaptors for various Message Service Centers (MSCs) including but not limited to Simple Messaging Service Center (SMSC) adaptor and Multimedia Messaging Service Center (MMSC) adaptor to be able to collect the data. The collected data is then uploaded onto the centralized social networking service module for further analysis by the analytical engine of the centralized social networking service module (204).

Figure 3:
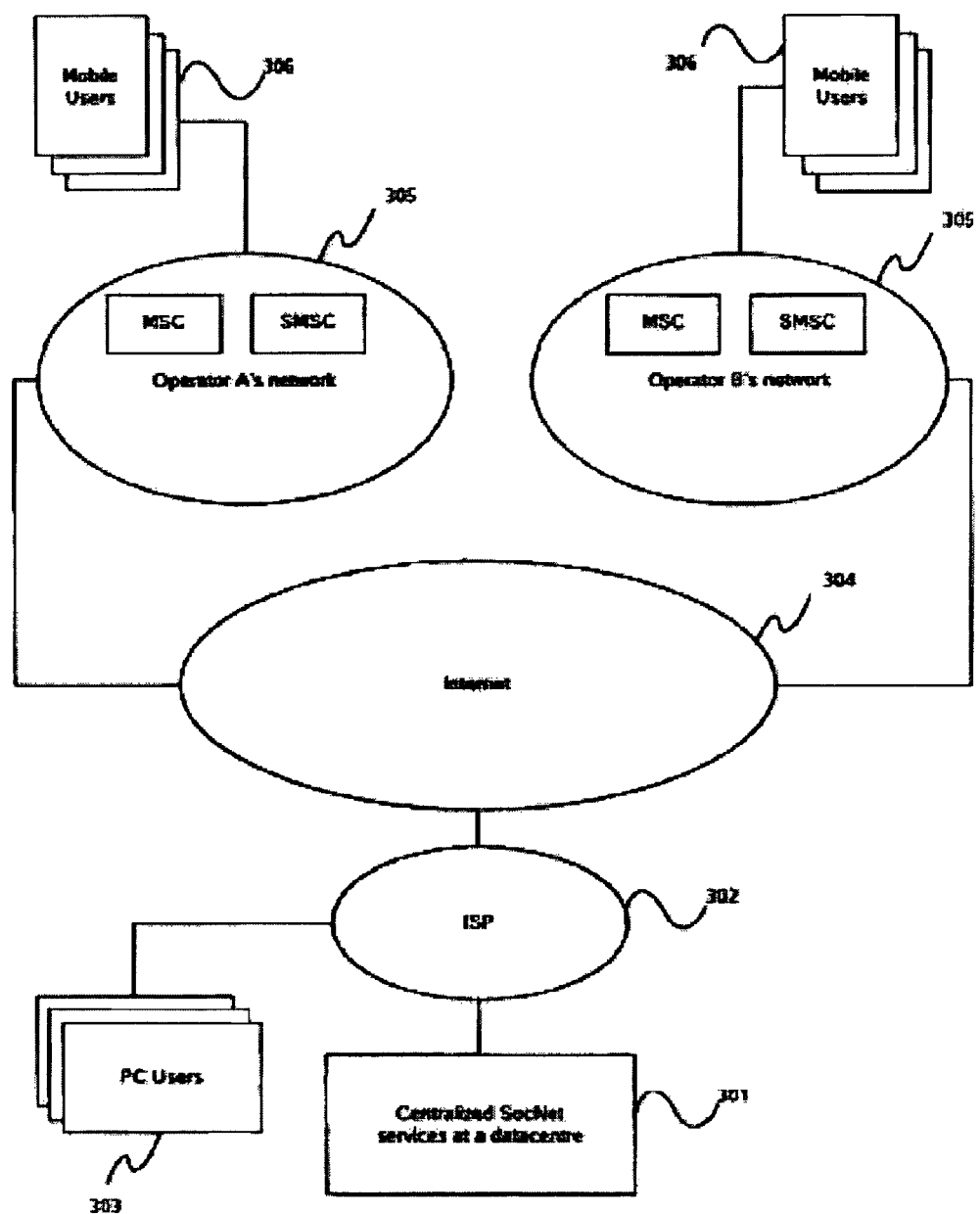
FIG. 3 provides a network view of the system of the invention

FIG. 3 shows the network view of the system of the invention. According to one embodiment of the invention, the centralized social networking services (301) are provided through the Internet (304) using any Internet Service Provider's (ISP) gateway (303). Then are a plurality of PC users (302) who are connected to the Internet service provided by the ISP. Also, there could a plurality of operators (305) operating using the ISP's Internet service as the backbone. In turn, there are a plurality of mobile subscribers (306) to any operator's network.

In one embodiment, a PC capable of communicating with the centralized social networking services could act a end user's terminal station. In another embodiment, a smart phone could act as the terminal station of a user. [note: check this]

Figure 4:
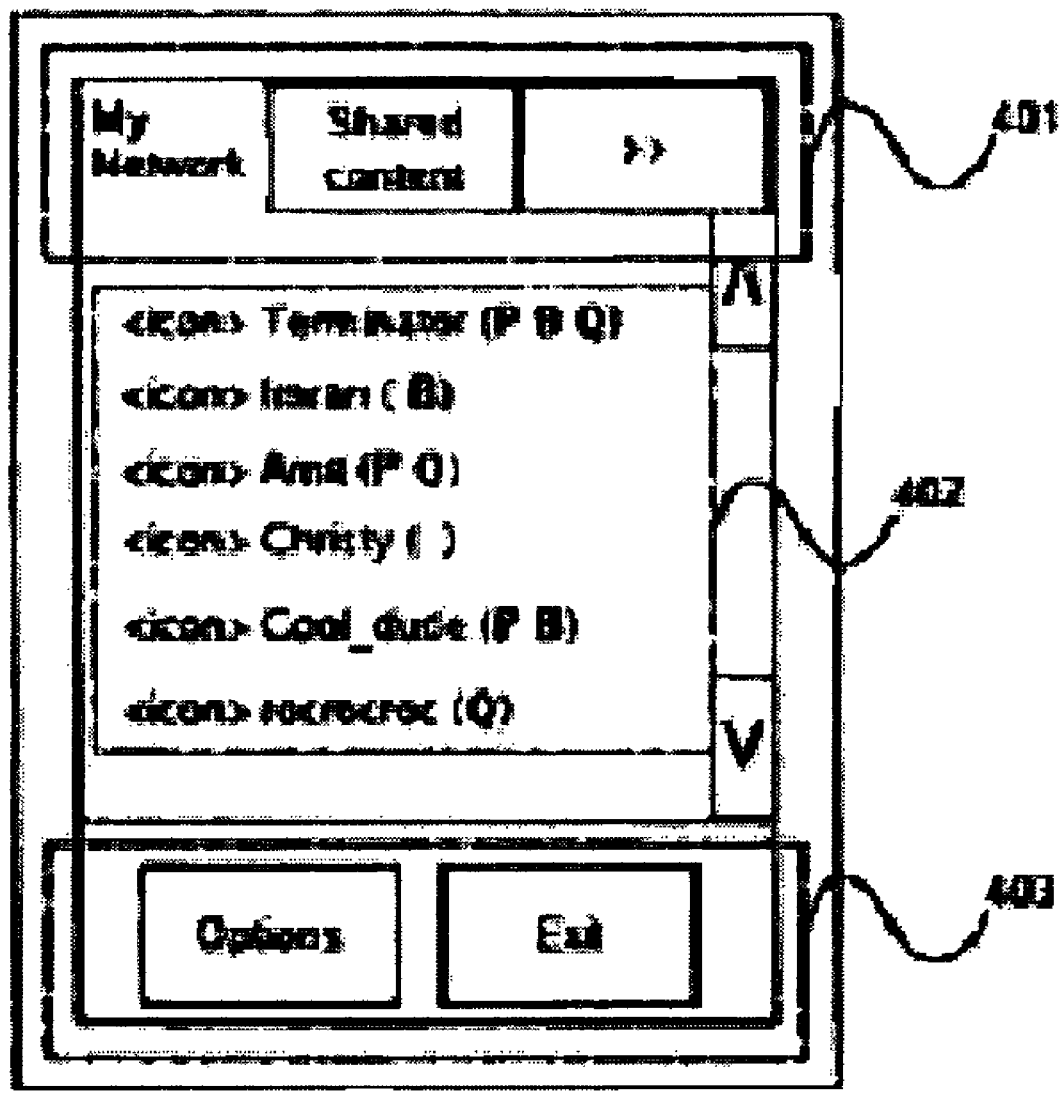
FIG. 4 shows the "My Network" screen of an example embodiment of the invention

FIG. 4 shows an example display (for example, display of a smart phone) of one application of the ready social network at the end user's terminal station. In FIG. 4, there is shown a list of users in the ready social network of a particular user. The top part of the display (401) shows tabs indicating the activity in which the user is currently involved in. In this example, the user is currently viewing his ready social network and therefore the tab "My Network" is active. In the center portion of the display (402) is shown a list of names along with their identifying icons as chosen by the respective users who are part of the ready social network. The letters adjacent to the names in braces indicate the activities the users have performed recently that have not been viewed by the current user. For example, the letter "P B Q" next to the name "Terminator" could indicate that the user "Terminator" have recently upload a picture (P) in the pictures section, also written out a new blog (B) open to access for the current user, and also has a query (Q) to which the current user can reply to. As another example, the braces next to the name "Christy" do not contain any letters. This means that the user "Christy" has no recent activity that the current user has not viewed. The bottom part of the display shows options (403) (either soft key options or hard key options) according to which the user can choose a suitable action. The two options shown in the example are "Options" to invoke various menu options and "Exit" to exit the ready social network application.

Figure 5A:
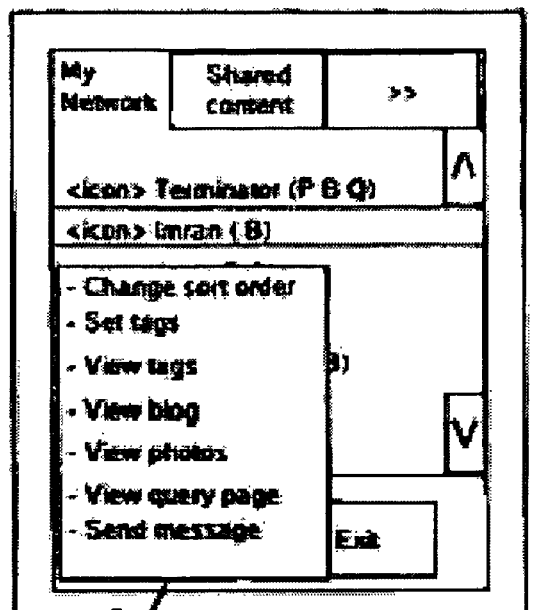
FIGS. 5A and 5B show the menu options in the "My Network" screen of an example embodiment of the invention
Figure 5B:
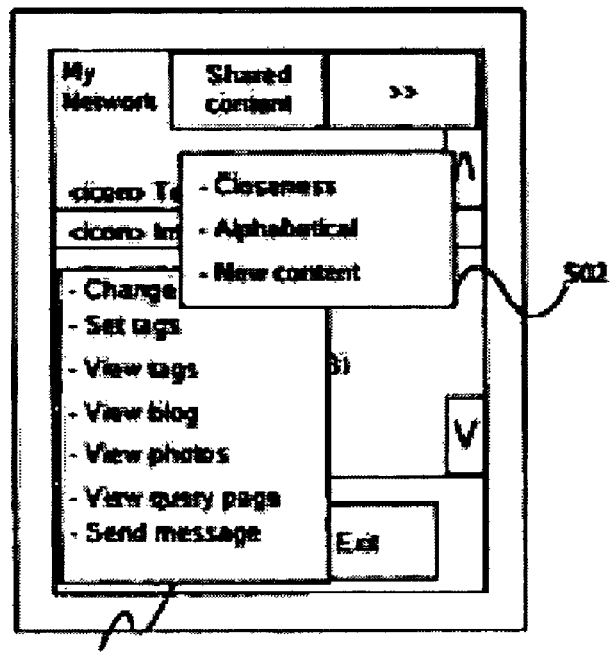

FIG. 5 shows an example of menu options that are possible to be displayed as part of the ready social networking activities. The menu options (501) give an indication of the facilities that are provided for people using the ready networking application services. The user can "change sort order" of the list of names, "set tags" to each person in his network to be able to control flow of his content upload by him in the ready social network, "view tags" by him to any particular user in his network, "view blog" of a particular user, "view photos" upload by any user within his ready social network, "view query page" of any user within his ready social network, and "send message" to any user in his ready social network. As an example, the sub-menu options (502) for the main menu (501) option "change sort order" includes options like changing sort order by "closeness" of the users in the ready social network, sorting the names by "alphabetical" order, and sorting the names by whether "new content" has been uploaded by the particular or not.

Figure 6:
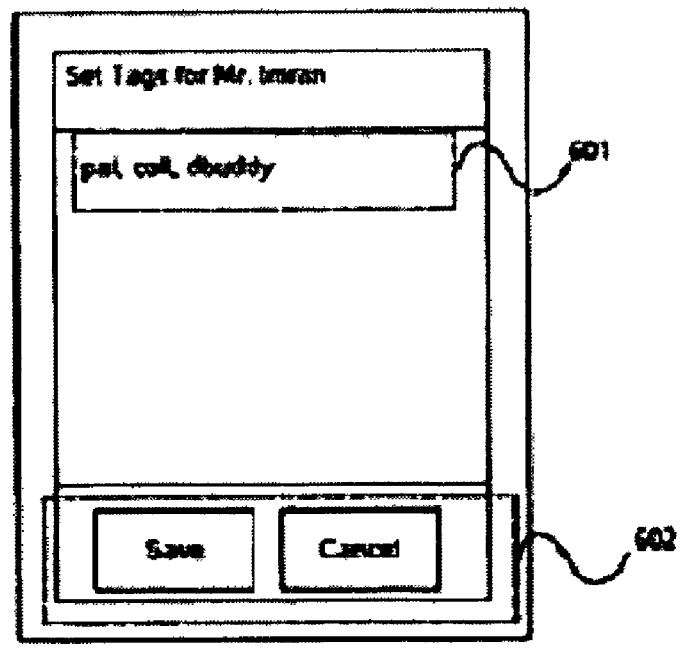
FIG. 6 shows the "Set tags" screen according to one embodiment of the invention

FIG. 6 shows the screen on display when the user chooses to "set tags" in main menu of options. Then the user is shown screen where the user can edit the existing tags set for that particular user ("Mr. Imran" in this example) (601). He may choose add a new tag, remove an existing tag or both. After changing the tags, the user can save the tags by choosing the save option in the button panel (602) at the bottom.

Figure 7:
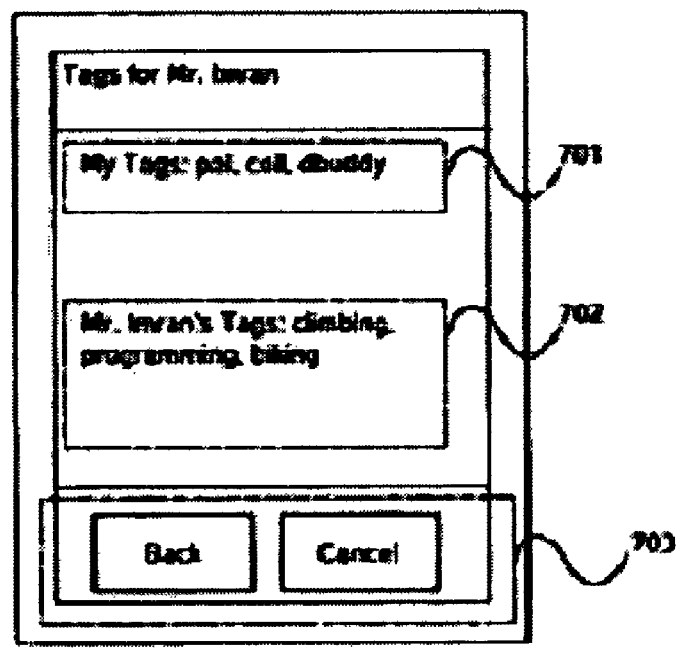
FIG. 7 shows the "View tags" screen according to one embodiment of the invention

FIG. 7 shows the screen on display when the user chooses to "view tags" of a particular user in the main menu of options. Then the user is shown a screen where the user can view the tags set by "Mr. Imran" (702) and the tags set by himself (701). The user can then choose to go to the previous screen according to this navigation sequence or he can choose to cancel the operation by selecting one of the buttons provided in the button panel provided at the bottom of the screen (703).

Figure 8:
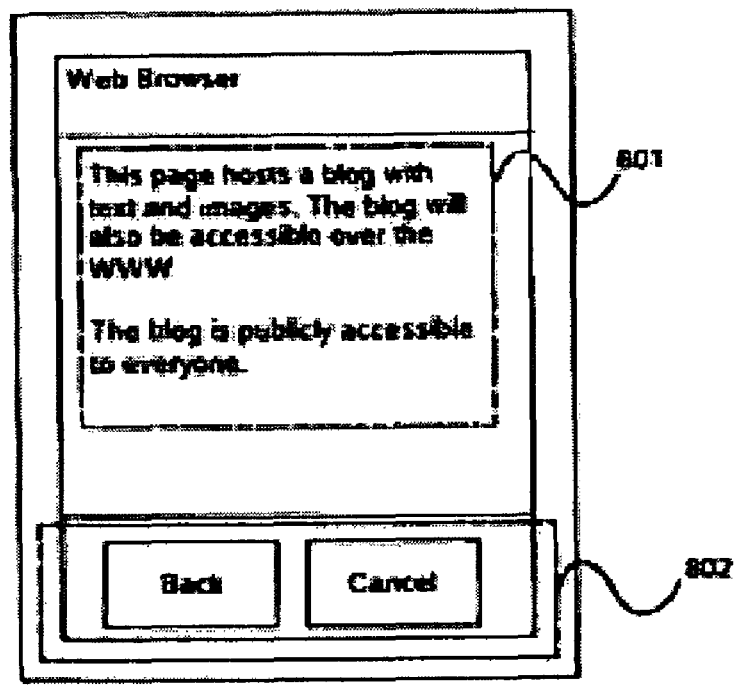
FIG. 8 shows the "View blog" screen according to one embodiment of the invention

FIG. 8, shows the screen on display when the user chooses to view blog of a particular user. In that case, in one embodiment of the invention, the application running on the user's terminal station opens a web browser (801) to browse all the blogs written by the user chosen. The user can then choose to go to the previous screen according to this navigation sequence or he can choose to cancel the operation by selecting one of the buttons provided in the button panel provided at the bottom of the screen (802).

Figure 9:
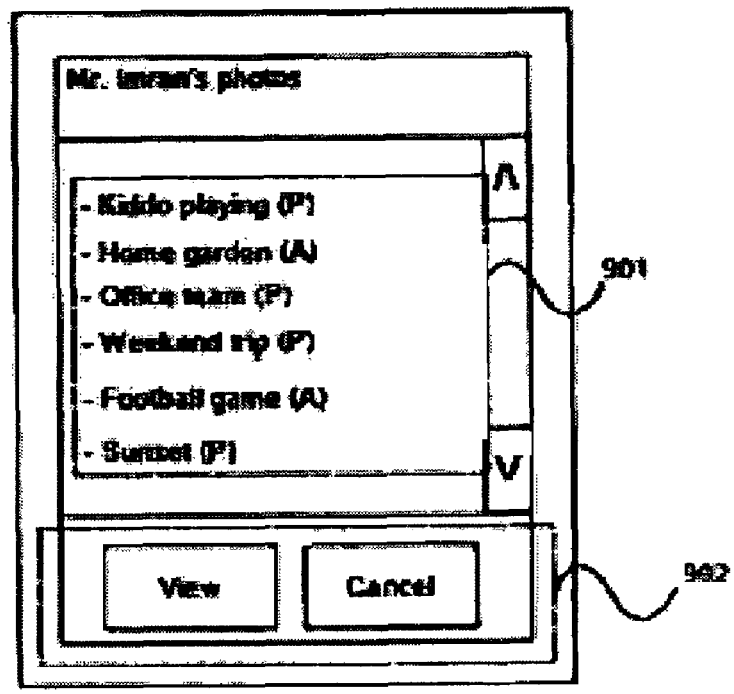
FIG. 9 shows the "View photos" screen according to on embodiment of the invention

FIG. 9 shows the screen on display when the user choose to "view photos" of a particular user in the main menu of options. Upon choosing the option, the user can view all photos/clippings uploaded by the user chosen ("Mr. Imran" in this example) (901). Once the listing is shown, the user can choose to view any one of them or he can cancel the operation to go back to the main page the application by choosing the appropriate option provided in the button panel (902).

Figure 10:
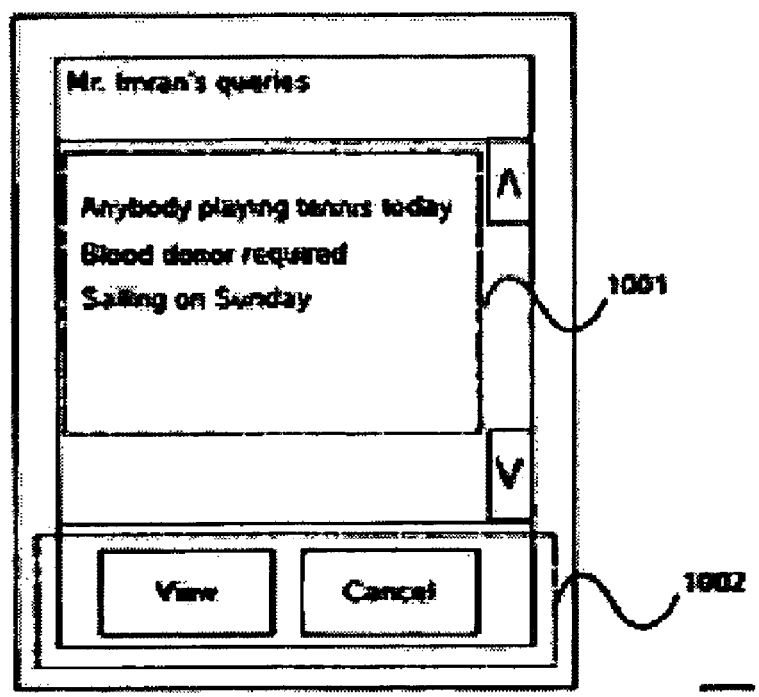
FIGS. 10, 11, and 12 show query page screens according to one embodiment of the invention
Figure 11:
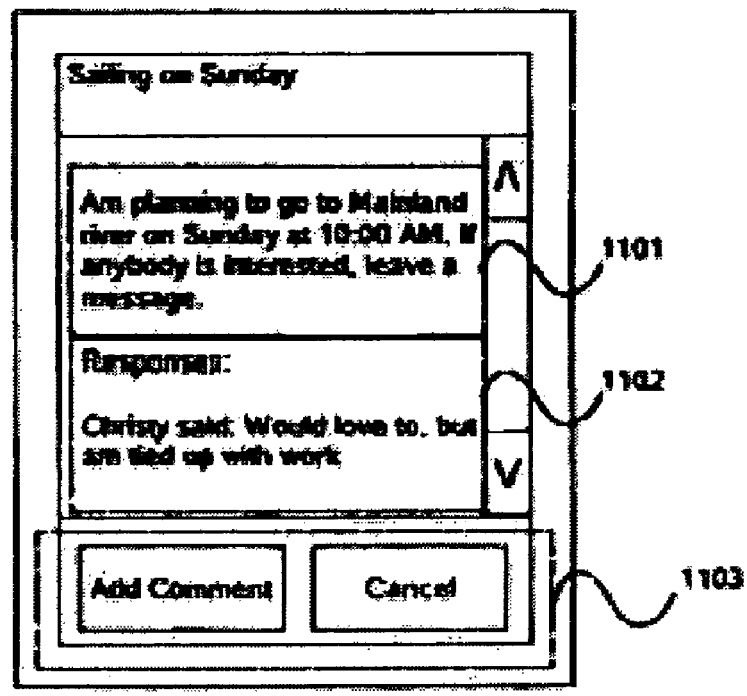
Figure 12:
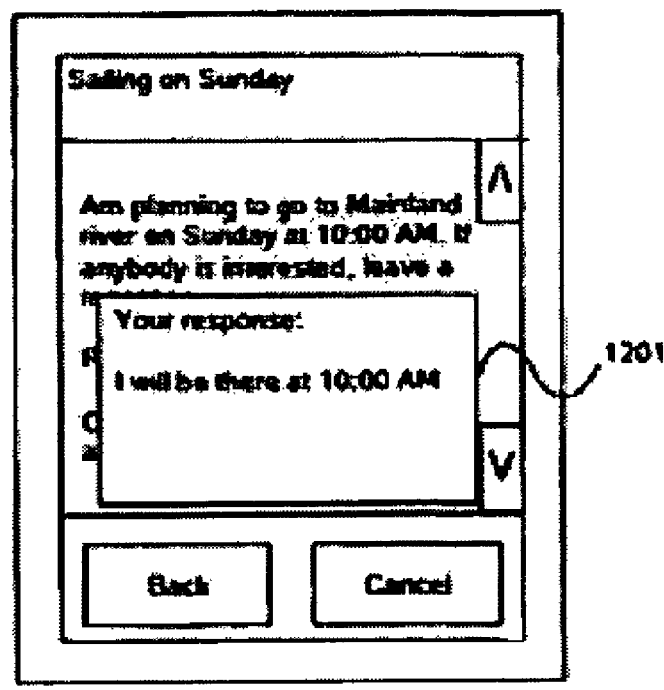

The can also choose to "view query page" of any user from the main menu options as shown by FIGS. 10, 11 and 12. FIG. 10 shows the listing of all queries by the user "Mr. Imran" (1001). Upon selecting a particular query, the details of the query (1101) is shown along with all the responses (1102) that have been for that particular query till date as shown in FIG. 11. As shown in FIG. 11, the user can choose to respond to the query once choosing that option, the user will be able to respond to the query (1201) as shown in FIG. 12.

Figure 13:
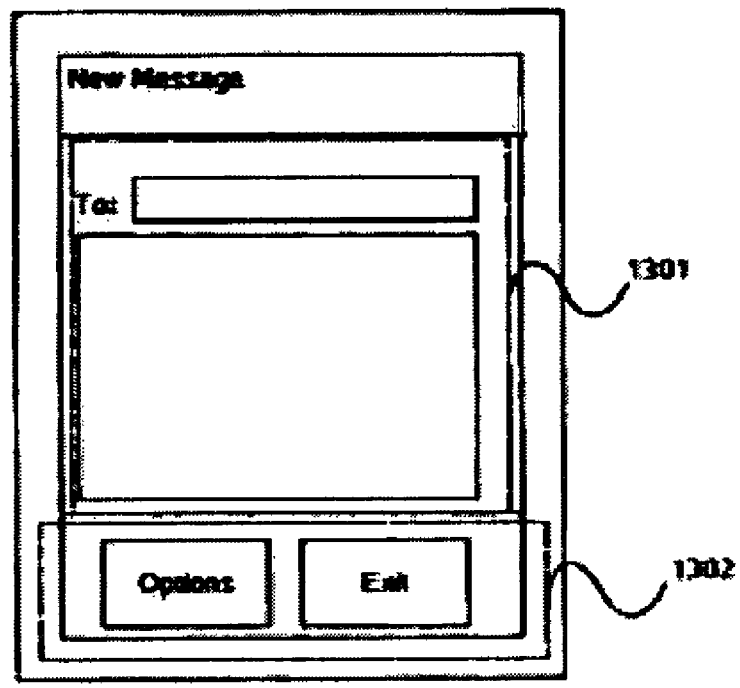
FIG. 13 shows a screen to compose a new message according to one embodiment of the invention

A user can also choose to "send message" to a any other person in his ready social network by choosing the option in the main menu. Then he will presented with a screen on his display as shown in FIG. 13. The interface to send a new message comprises the composer section (1301) and the button panel where he can choose to send the message or cancel the message (1302).

Figure 14A:
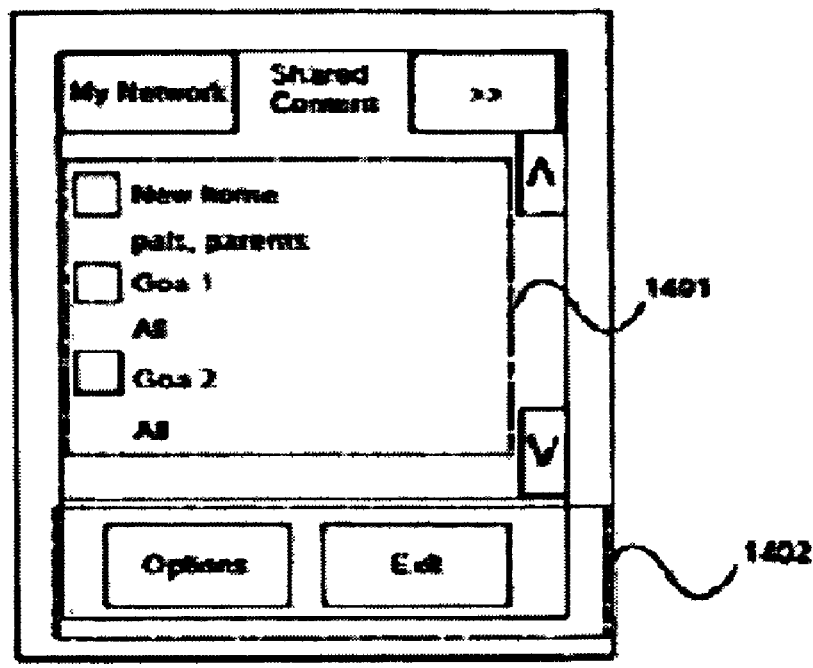
FIGS. 14A and 14B show the screens for managing shared content according to one embodiment of the invention

A user can upload content to share with other people in his ready social network. As shown in FIG. 14A, a user can control the access to the content he upload to the network using the tags that he crated for various people within his ready social network. The screen on display as shown in FIG. 14A lists all the content uploaded for access by various tagged groups in the ready social network (1401). For example in FIG. 14A, the content "New Home" is only intended for people tagged as "pals" and "parents" and the content "Goa 1" is intended for "all" in the network. In one embodiment, the tag "all" could be a pre-defined default tag that is applicable to everyone in the ready social network. The button panel (1402) at the bottom provides for two buttons, "Options" to choose various options and "Exit" to exit from the shared content page.

Figure 14B:
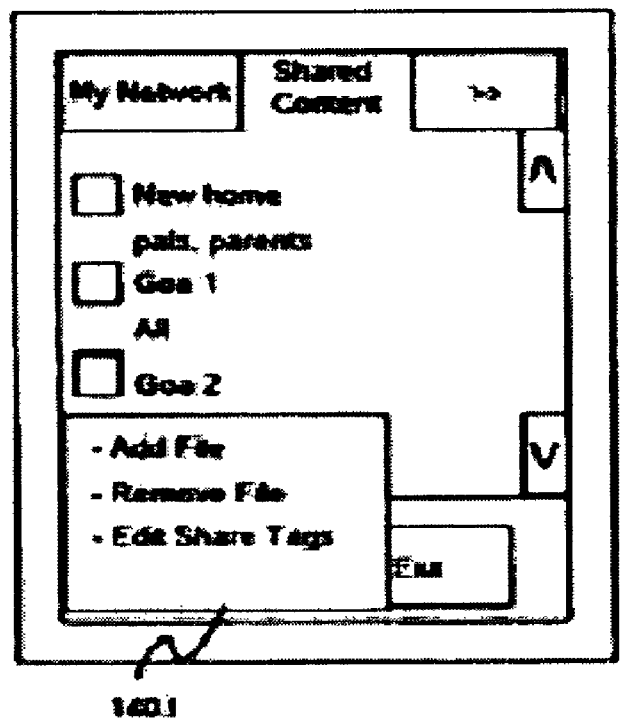
Figure 15:
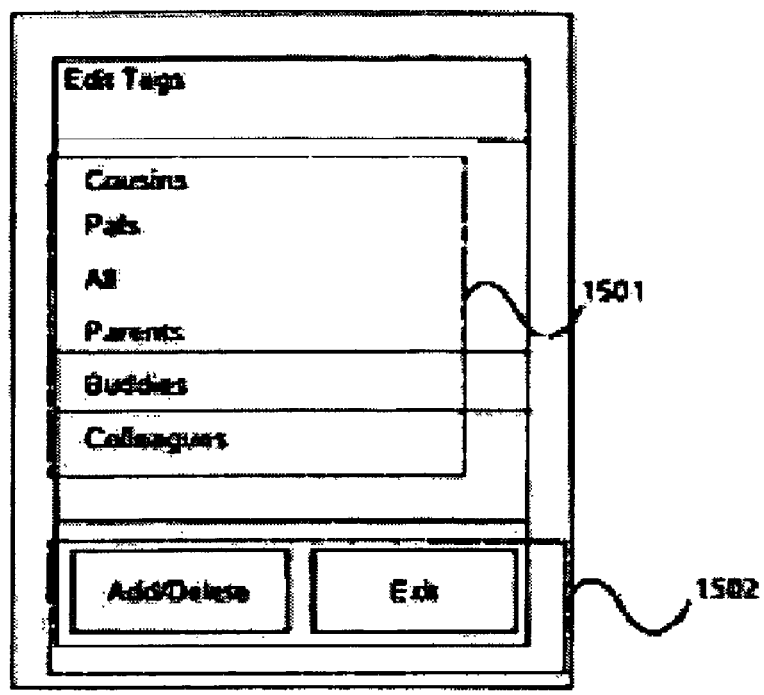
FIG. 15 shows the screen to edit set tags for any given shared content according to one embodiment of the invention

FIG. 14B shows the various possible options displayed when the button "Options" is clicked as shown in FIG. 14A. The user could a new file using the option "Add File" (1403). The user could remove a selected file from the list by choosing the option "Remove Files". The can also edit share tags for any selected file from the list by selecting "Edit Share Tags". Upon selecting the option "Edit Share Tags", the user is shown a screen, as shown in FIG. 15, where he can edit the existing tags (1501) set for a file by using the "Add/Delete" button (1502). The user can choose to add a new tag or select an existing tag and remove it.

Figure 16:
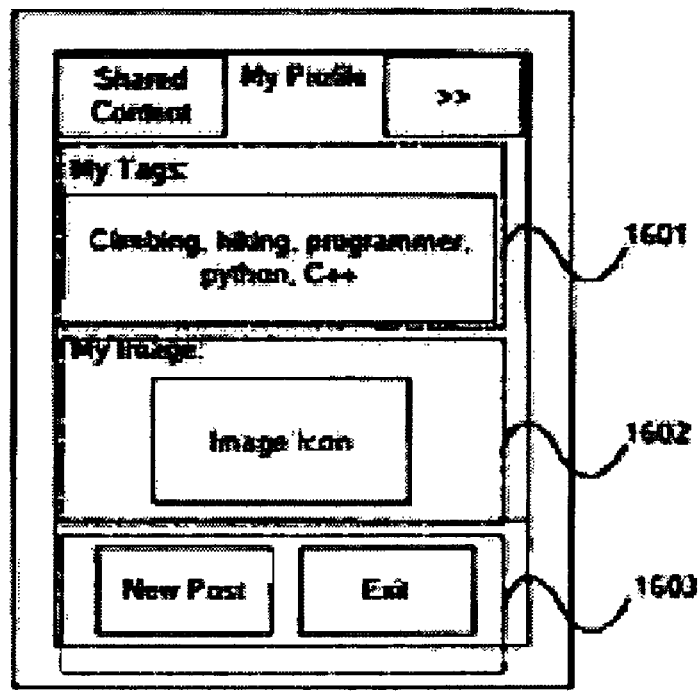
FIG. 16 shows the profile page for a user managing social network according to one embodiment of the invention

By scrolling to the right by clicking the ">>" button on the top half of the screen, as given in the example in FIG. 16, the user can view his own profile. The sections that are shown within his own profile are the tags that he has defined (1601), and his identification icon (1602) that he has uploaded for others to view whenever they see his name. The button panel at the bottom of the display provide options to create a to post a new blog using "New Post" and exit the application using "Exit" button (1603).

Figure 17:
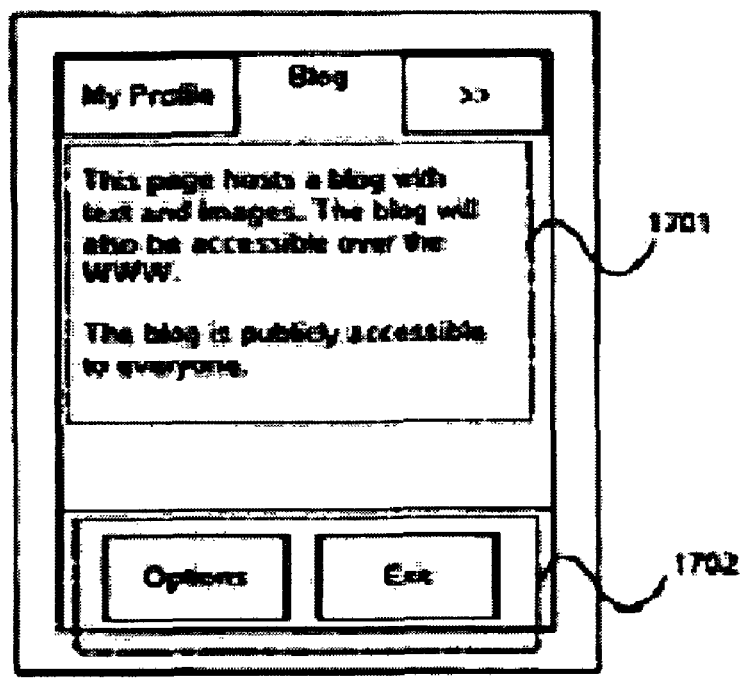
FIG. 17 shows the blog page of a user according to one embodiment of the invention

The system can also allow users to blog and share the blogs by invoking a pre-configured blogging web application through an external web browser present on the phone. FIG. 17 shows a display screen where the user can enter text to blog. The application could be any blogging application that is accessible through a normal web page. From the same page, user can invoke menu options-available on the main page as illustrated in FIG. 5 using "Options" button on the button panel at the bottom. Also the user can choose the exit the blogging application by using the "Exit" button of the button panel.

Figure 18:
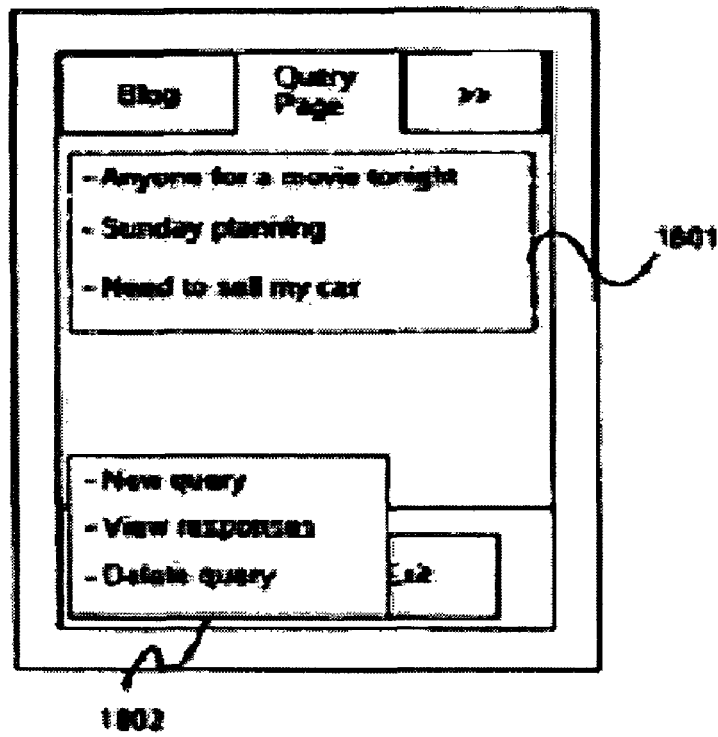
FIG. 18 shows the screen for managing queries according to one embodiment of the invention

The user can also view his own queries posted till date in the query page. The query page as shown in FIG. 18, shows a list of queries posted till now (1801). Upon selecting a particular query, another screen a showing the details of the query and all the responses from various uses for that query. On the query page, the user can invoke menu options. The menu option available are to post a new query using "New query", view responses to a particular query by choosing "View responses", and delete an existing query by choosing the option "Delete query" (1802).

Figure 19:
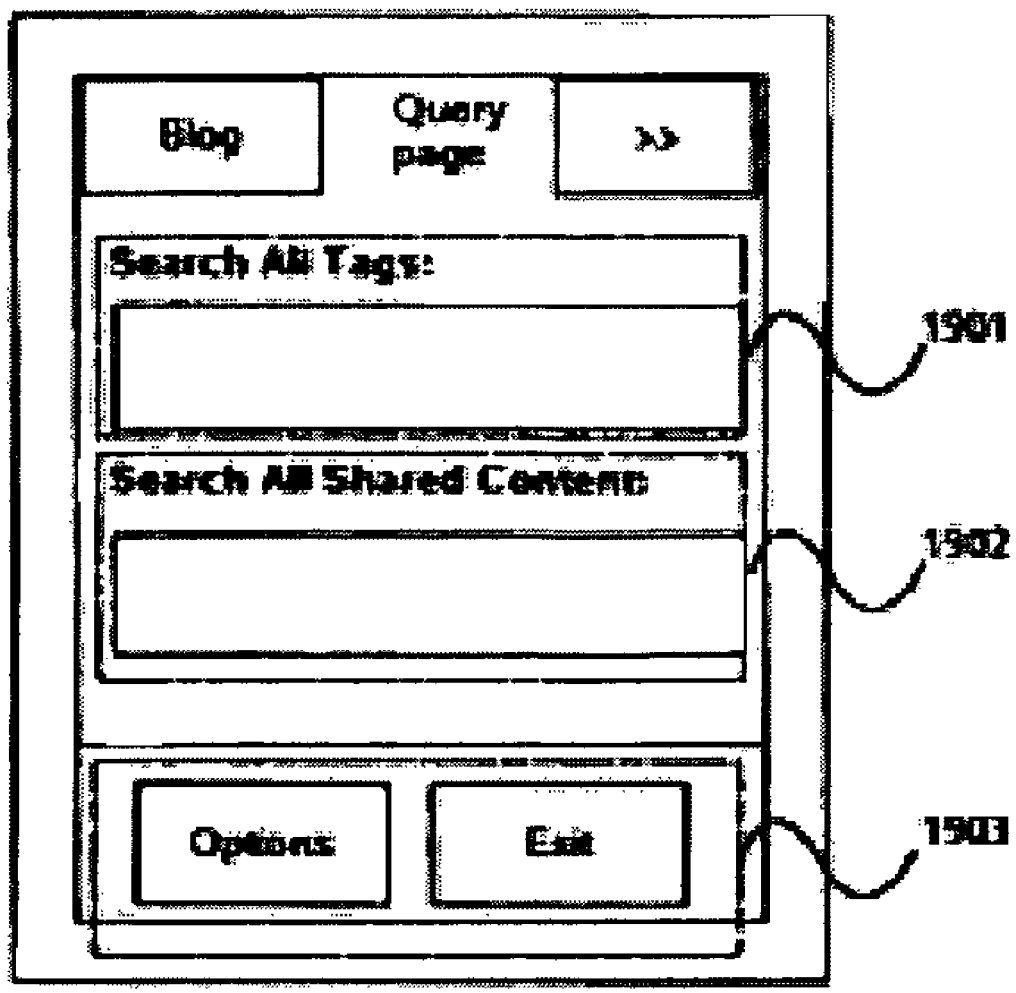
FIG. 19 shows a screen with search interface to search shared content

The user can also search for content using a search interface as shown in FIG. 19. The interface provides for two kinds of searches. One kind of search involves searching for content based on tags associated with the content (1901). The other kind of search provided is to search all content based on text within the content (1902). In another embodiment of the invention, search could also be provided to search for a user within the ready social network based on the reach measured by the network depth.

Although the present invention has been described with particular reference to specific examples, variations and modifications of the present invention can be effected within the spirit and scope of the following claims.

The invention claimed is:

1. A method of facilitating ready social networking, comprising:

obtaining from mobile telecommunication handsets and from mobile telecommunication network equipment, user activity data for a plurality of mobile telecommunication subscribers over a mobile telecommunication network, the user activity data comprising at least one of voice call records, Simple Messaging Service (SMS) records, and Multimedia Messaging Service (MMS) records;

collecting the user activity data centrally at an application server to form a ready social network of persons interacting with each other without actively seeking to form a social network;

mining at the application server the user activity data collected for each of the plurality of mobile telecommunication subscribers, to form clusters relevant for that mobile telecommunication subscriber;

providing at the application server an application programming interface (API) based on the user activity data available;

providing an application services module that provides a plurality of application services using said API, to the plurality of mobile telecommunication subscribers;

providing an user interface at each of the mobile telecommunication handsets to enable to access to said application services and said API through the mobile telecommunication handsets.

2. A method of facilitating ready social networking as claimed in claim 1, wherein the voice call records comprising at least one of time of call, duration of call, location of calling telecommunication handset, and number of bidirectional calls by each mobile telecommunication subscriber.

3. A method of facilitating ready social networking as claimed in claim 1, wherein the mobile telecommunication network equipment from which user activity is obtained is a Message Service Center (MSC).

4. A method of facilitating ready social networking as claimed in claim 3 wherein the Message Service Center (MSC) is a Simple Messaging Service Center (SMSC) or a Multimedia Message Service Center (MMSC).

5. A method of facilitating ready social networking as claimed in claim 1, the method further comprising the steps of at least one of the mobile telecommunication subscribers enriching his ready social network by using tags to group persons within the ready social network.

6. A method of facilitating ready social networking as claimed in claim 5, the method further comprising the step of the application server using tag information to refine clusters relevant to the mobile telecommunication subscriber.

7. A method of facilitating ready social networking as claimed in claim 6, wherein the mobile telecommunication subscriber's social network is determined based on frequency of interactions with persons with the ready social network, said frequency being available from the user activity data.

8. A method of facilitating ready social networking as claimed in claim 6, wherein the clusters formed are clusters of persons within the ready social network that a particular mobile telecommunication subscriber is possibly interested in grouping together to communicate effectively within the ready social network.

9. A method of facilitating ready social networking as claimed in claim 6, wherein the API is an interface to access said clustered data for said plurality of application services.

10. A method of facilitating ready social networking as claimed in claim 6, wherein the plurality of application services comprising at least one of content sharing within the ready social network, a market place for buying and selling goods and services, a facility to identify people interested in dating, a facility to identify people with similar professional interests, a facility to find people in a new location that a mobile telecommunication subscriber is traveling to, a facility to find people within a specified number of hops within the mobile telecommunication network, or a blog facility.

11. A system facilitating ready social networking, comprising:

a application server adapted to collect user activity data from a plurality of mobile telecommunication handsets and from mobile telecommunication network equipment wherein said user activity data comprises at least one of voice call records, Simple Messaging Service (SMS) records, and Multimedia Messaging Service (MMS) records, to analyze the user activity data collected to form clusters relevant for each of the plurality of mobile telecommunication subscribers, and to provide a ready social network API;

an application services module that uses said API to provide a plurality of social networking services to the plurality of mobile telecommunication subscribers;

the mobile telecommunication handsets adapted to communicate with said application services module and said API to enable access to a plurality of application services, to display information using a user interface (UI) module for selection, viewing and navigation, and to upload user activity data to said application server; and a network data loader to collect user activity data from the mobile telecommunication network equipment using a plurality of messaging service center (MSC) adaptors and to upload said user activity data to the application server.

12. A system facilitating ready social networking as claimed in claim 11, wherein the application server is a server capable of running a plurality of applications.

13. A system facilitating ready social networking as claimed in claim 11 wherein said API is accessible using Simple Object Access Protocol (SOAP) or Hyper Text Transport Protocol (HTTP).

14. A system facilitating ready social networking as claimed in claim 11, wherein said application services are accessible using Simple Object Access Protocol (SOAP) or Hyper Text Transport Protocol (HTTP).

15. A system facilitating ready social networking as claimed in claim 11, wherein at least one of the plurality of mobile telecommunication handsets is a smart phone.

16. A system facilitating ready social networking as claimed in claim 11, wherein the plurality of MSC adaptors comprises at least one Simple Messaging Service Center (SMSC) adaptor for collecting SMS records.

17. A system facilitating ready social networking as claimed in claim 11, wherein the plurality of MSC adaptors comprises at least one Multimedia Messaging Service Center (MMSC) adaptor for collecting MMS records.

* * * * *